Nov. 29, 1966 M. L. DONALDSON 3,288,937
DIODE SWITCHED PAD CIRCUIT
Filed Nov. 26, 1963
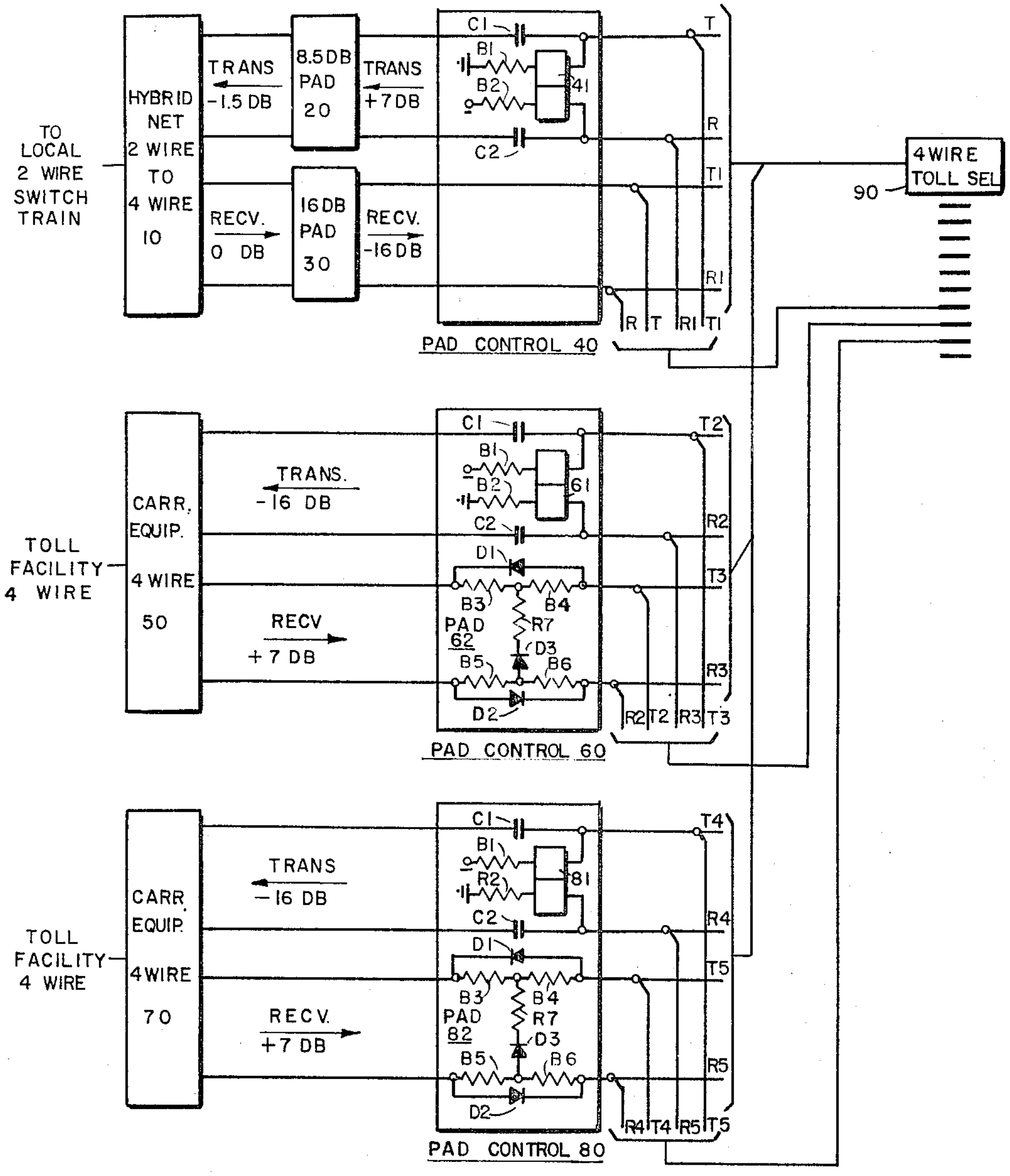
INVENTOR.
MARCUS L. DONALDSON
BY C. A. Gullbrandsen
ATTY.

United States Patent Office 3,288,937
Patented Nov. 29, 1966

3,288,937
DIODE SWITCHED PAD CIRCUIT

Marcus L. Donaldson, Mount Prospect, Ill., assignor to Automatic Electric Laboratories, Inc., Northlake, Ill., a corporation of Delaware Filed Nov. 26, 1963, Ser. No. 325,858
8 Claims. (Cl. 179—16)

This invention pertains to telephone transmission facilities, and particularly to the maintenance of proper signal levels in telephone transmission facilities.

Today with the advent of direct distance dialing and extensive telephone networks both in the United States and abroad emphasis has been placed on the improvement of transmission characteristics of long distance telephone facilities.

Present switching facilities allow most long distance telephone calls to be completed on direct circuits or over two or three intertoll trunks switched together in tandem. However a smaller portion of the total number of calls will employ as many as seven or eight intertoll trunks. Because of this the design of toll transmission facilities is concentrated on maintaining transmission value to extremely close tolerances.

The use of four wire toll facilities is highly effective in the reduction of the echo and singing effects often present on long distance toll lines. At present the bulk of large toll switching centers are operated on this basis. To insure optimum operation of four wire toll facilities certain standards for these facilities have been adopted. It is the current practice that at a given four wire termination in a toll center, such as carrier, radio, loaded cable, etc. incoming signals to intertoll trunks in the office are received at a level of +7 db and outgoing signals are transmitted to the four wire facility at a level of −16 db. Obviously the transmission levels of incoming and outgoing signals are 23 db apart.

When two four wire toll facilities are tandemed through a given telephone office it becomes necessary to insert two 23 db pad circuits in the transmission path to reduce the incoming signal of +7 db received by a first distant office to a −16 db level for transmission to a second distant office. At the same time the incoming signals from the second distant office must be reduced from the +7 db level by 23 db pad to a −16 db level for transmission out over the four wire facility to the first distant office.

If tandem switching over four wire toll facilities were the only requirement it would be a simple matter to include a fixed 23 db pad circuit in the received path of each intertoll trunk connected to a four wire toll facility. However when a telephone call is terminated in the given telephone office rather than tandemed through it the 23 db fixed pad would permit proper transmission levels into the local two wire switching equipment. Therefore some means of including the 23 db pad in the intertoll trunk circuits when being used on a tandem basis but removing the pad when the call is to be terminated in the local office rather than switched through to another office, must be provided.

In the past the switching of the pad circuit in or out of an intertoll trunk has been accomplished by means of relays with their attendant requirement of space, high battery current and high cost.

Accordingly it is the object of applicant's invention to provide a pad circuit that may be switched in or out of intertoll telephone trunks to meet transmission requirements, that is economical to manufacture and operate and requires a minimum of physical space when mounted in the telephone toll switching center.

A principal feature of the instant invention is the use of diodes as switching devices for control of a pad circuit.

Another feature is the inclusion of means for biasing the diodes used to switch the pad circuit in accordance with the type of facility being accessed by the intertoll trunk.

The various objects and features of the invention will appear from the description which will be rendered below with reference to the accompanying drawing which is a diagrammatic representation of a portion of a telephone toll office and in which the pad control facilities in accordance with this invention are shown schematically.

Referring to the drawing the hybrid network 10 may be of any well-known design whereby a two-wire transmission facility is converted to a four-wire transmission facility. The two-wire termination side of the hybrid network is connected to the local two-wire switch train. The four-wire termination side has the two conductors of the transmit path connected to a pad 20 which has an insertion loss of approximately 8.5 db. The receive channel terminations of hybrid network 10 is connected to pad 30 which has an insertion loss of approximately 16 db. Pads 20 and 30 in turn are connected to pad control circuit 40 as indicated.

The transmit leads are coupled through capacitors C1 and C2 to leads T and R are connected to the incoming circuitry of four-wire toll selector 90. The T1 and R1 leads coming from the 16 db pad 30 continue through pad control circuit 40 to the input of four-wire toll selector 90. Likewise the local switch train two-wire circuit may be accessed from the four-wire toll selector 90 via its fourth level as shown, and its multiple connections to pad control 40 which are reversed in designation from those extending to the input of the toll selector.

Four-wire toll facilities are shown as terminated in carrier equipment 50 on a four-wire basis. The carrier equipment 50 transmit path is connected to pad control 60 and the receive terminations are connected to pad control 60 also. The transmit facilities are coupled through capacitors C1 and C2 of pad control 60 by leads T2 and R2 to the incoming portion of four-wire toll selector 90, likewise the transmit channel is accessed from the third level of the four-wire toll selector 90 by means of multiple connections designated T3 and R3. The receive portion is coupled through pad 62 and leads T3 and R3 to the incoming portion of the four-wire toll selector and is accessed via the third level of the four-wire toll selector through multiple connections designated T2 and R2. A second four-wire toll facility is also indicated consisting of carrier equipment 70 and pad control circuit 80. Here the transmit channel circuitry is conducted to the incoming portion of the toll selector through conductors T4 and R4 and is accessed via multiple contacts T5 and R5 from level 2 of the toll selector. The receive portion of this facility is coupled through leads T5 and R5 to the incoming portion of the toll selector and accessed via multiple leads T4 and R4 on an outgoing basis. The receive portion is coupled to the selector through leads T5 and R5 and accessed via the second level of four-wire toll selector 90 by multiple connections designated T4 and R4.

In the pad control unit 40 the necessary biasing means only are included, consisting of battery feed coil 41, and battery and ground supplied through resistances B1 and B2. In pad control 60 similar biasing circuitry is provided, and a fixed 23 db pad 62 is also included. Circuitry of pad control 80 is identical to that of pad control 60.

The best understanding of the present invention may be had by tracing the placement of telephone calls through the facilities shown in the drawing in several manners permissible.

*Local to toll calls*

Telephone calls placed in the local office are dialed in the usual manner and conducted through the local switching facilities accessing the hybrid network to a selector level assigned for toll access. The circuit is extended on a four-wire basis through pads 20 and 30, through pad control 40 and over conductors T, R, T1 and R1 to the incoming portion of four-wire toll selector 90. Assuming the next digit received is the digit 3, the call will be further extended via the third level of the toll selector 90 and multiple contacts T2, R2, T3 and R3 to pad control 60 and then through the carrier equipment 50 where they are connected to the toll facility on a four-wire basis. It is the intent and purpose of the present invention to provide the carrier equipment and four-wire toll facility with signals in the transmit channel at a −16 db level and in the receive channel at a +7 db level. The desired signal levels are obtained in the following manner.

At the hybrid network 10, the transmit channel is normally at a −1.5 db and the receive level at 0 db. Taking first the receive channel the 0 db level of the receive channel coming from the hybrid network is further padded by pad 30 in the amount of 16 db. As can be seen this circuit is conducted via conductors T1 and R1 through the four-wire toll selector via the third level of the selector and multiple connections T3 and R3 to the pad control unit 60. In the pad control unit 60 the signal is coupled through capacitors C1 and C2 to the carrier equipment and transmit channel carrier equipment 50 at the level of −16 db.

The signals in the receive channel from carrier equipment 50 are at the level of +7 db. These signals are conducted through pad 62 of pad control 60 and conductors T2 and R2 back via the third level of four-wire toll selector 90 and the via conductors T and R to the pad control unit 40 associated with the hybrid network 10. The bias circuitry for this path extends from negative battery through resistance B2, the lower winding of battery feed coil 41, connector R, toll selector 90, its associated third level, multiple conductor R2 to forward bias diode D2, and from ground through resistance B1, upper winding of battery feed coil 41, connector T, toll selector 90, its associated third level, multiple conductor T1 to forward bias diode D1. With diodes D1 and D2 biased in their forward direction it can be seen that signals in the receive channel coming from the carrier equipment 50 at a level of +7 db may be conducted through these diodes with little or no insertion loss to the transmit channel associated with hybrid network 10. Capacitors C1 and C2 of pad control unit 40 prevent the D.C. bias being extended through pad 20 to the hybrid network. The signal level in transmit channel extended forward through capacitors C1 and C2 is at the +7 db level. To achieve the −1.5 db level desired for transmission purposes in the local switch train, pad 20 inserts a loss of 8.5 db.

*Toll to local calls*

When a call is received via the four-wire toll facility that is intended for termination in the local office signals are extended through the carrier equipment 50 to pad control 60 and via leads T2, R2, T3 and R3 to the four-wire toll selector 90. Receipt of the appropriate dial pulses will extend that circuit via the fourth level of the toll selector 90 over multiple connectors T, R, T1 and R1 to the pad control unit 40 and from thence through pads 20 and 30 to the hybrid network 10. The operation of the pad control units 40 and 60 are the same as in the placement of a local to toll call.

*Toll to toll calls*

Incoming calls from a four-wire toll facility through carrier equipment 50 that are intended for extension through the toll center to a distant toll point on a tandem basis to the four-wire toll facility connected to carrier equipment 70 are made by extending the call through carrier equipment 50, associated transmit and receive channels, through pad control 60 through leads T2, R2, T3 and R3 to the four-wire toll selector 90. Receipt of appropriate switching pulses will further extend the call via the second level of the toll selector to multiple connections T4, R4, T5 and R5 to pad control 80 and via the transmit and receive channels to carrier equipment 70 where it will be coupled to another four-wire toll facility. Since it is desired that signals coupled to the transmit channel of carrier equipment 50 be at the −16 db level, bias for the −23 db pad B2 included in pad control 80 is extended from battery through resistance B1, the upper winding of battery feed coil 61, over conductor T2 to the four-wire toll selector 90, its level 2, to conductor T4 and then to the pad control unit 80. As can be seen this negative battery will back bias the diode D1 in pad circuit. Likewise ground extended through resistance B2, the lower winding of battery feed coil 61, via lead R2 through the four-wire toll selector and multiple connection R4 to the 23 db pad in pad control 80, to back bias diode D2 also.

Incoming signals received from the carrier equipment 70 in the receive channel are at a +7 db level. Inasmuch as these signals cannot pass through the back biased diodes D1 and D2 in pad control unit 80 they must be conducted through the pad circuit itself which has an insection loss of 23 db. The resultant signal at the −16 db level is conducted via multiple conductors T4 and R4 back through the four-wire toll selector to pad control unit 60 where it is coupled through capacitors C1 and C2 to the transmit channel associated with the carrier equipment 50 at the −16 db level.

Similarly, signals coupled to the transmit channel of carrier equipment 70 must also be at the −16 db level. Bias for the 23 db pad included in pad control 60 so as to attenuate the receive channel of carrier equipment 50, is provided by battery and ground extended through resistances B1 and B2 and battery feed coil 81 of pad control 80, through the four-wire toll selector 90 to the pad 62 included in pad control unit 60. As outlined above this battery and ground will be effective to back bias diodes D1 and D2 of pad control 60, causing signals received over the receive channel associated with carrier equipment 50 to be attenuated 23 db by insertion of the pad 62. Thus in the placement of a toll call tandeming through from one toll facility to another through a local office, 23 db pads are inserted in both channels for maintenance of proper transmission levels.

What is claimed is:

1. Transmission means including: a first signal path for the conduction of signals through said means; a second signal path including attenuation means; control means; said first signal path including unidirectional conducting means connected to said control means, operated in response to said control means to block conduction of signals through said signal path; whereby signals transmitted through said transmission means will be conducted via said second signal path, and attenuated by said attenuation means.

2. Transmission means including: biasing means, a first and a second circuit conductor, each of said conductors including attenuation means, and unidirectional conducting means in parallel with said attenuation means, and connected to said biasing means, operated in response to said biasing means to block transmission of signals conducted over said first and said second conductors, through said unidirectional conducting means, whereby said signal will be conducted through said attenuation means and attenuated by said attenuating means.

3. Transmission means as claimed in claim 2 wherein each of said unidirectional conducting means each comprise a diode, polarized opposite to the other, and wherein said biasing means comprise a negative battery source, and a positive battery source, each connected to one of said diodes, to back bias said diodes to block conduction of signals therethrough.

4. Transmission means as claimed in claim 2, wherein said attenuation means comprise a fixed pad.

5. A transmission network, including an incoming transmission circuit, an outgoing transmission circuit, switching means operated to connect said incoming circuit to said outgoing circuit, and attenuation control means comprising: attenuation means, and unidirectional conducting means in parallel relationship to each other, included in said incoming transmission circuit; control means included in said outgoing circuit connected through said switching means to said unidirectional conducting means in said incoming circuit; said unidirectional conducting means operated in response to said control means to block the transmission of signals through said unidirectional conducting means; whereby signals transmitted over said incoming transmission circuit to said outgoing transmission circuit via said switching means are conducted through said attenuation means, said signals attenuated by said attenuation means.

6. A transmission network including an incoming transmission circuit, an outgoing transmission circuit, switching means operated to connect said incoming circuit to said outgoing circuit, and attenuation control means comprising: a fixed pad, a first and second diode each in shunt relationship to said pad, each of said diodes polarized opposite to the other, said pad and said diodes include in said incoming transmission circuit; a source of positive battery, and a source of negative battery included in said outgoing transmission circuit, each connected through said switching means to a different one of said diodes so as to back bias said diodes and prevent transmission of signals through said diodes; whereby signals transmitted over said incoming transmission circuit to said outgoing transmission circuit via said switching means, are conducted through said fixed pad, said signals attenuated by said pad.

7. A transmission network including an incoming transmission circuit, a first outgoing transmission circuit and a second outgoing transmission circuit, switching means operable to connect said incoming transmission circuit to said first outgoing transmission circuit, or to said second outgoing transmission circuit, and attenuation control means comprising: attenuation means and unidirectional conducting means in parallel relationship to each other included in said incoming transmission circuit; first control means in said first outgoing transmission circuit connected to said unidirectional conducting means in said incoming transmission circuit in response to operation of said switching means to connect said incoming transmission circuit to said first outgoing transmission circuit; said unidirectional conducting means blocked in response to connection to said first control means, whereby signals transmitted through said incoming transmission circuit to said first outgoing transmission circuit, via said switching means, are conducted through said attenuation means and are attenuated by said attenuation means; second control means in said second outgoing transmission circuit connected to said unidirectional conducting means in said incoming transmission circuit in response to operation of said switching means to connect said incoming transmission circuit to said second outging transmission circuit, said unidirectional conducting means rendered conductive in response to connection to said second control means, whereby signals transmitted through said incoming transmission circuit to said outgoing transmission circuit via said switching means are conducted through said unidirectional conducting means and around said attenuation means.

8. A transmission network including an incoming transmission circuit, a first outgoing transmission circuit and a second outgoing transmission circuit, switching means operable to connect said incoming transmission circuit to said first outgoing transmission circuit, or to said second outgoing transmission circuit, and attenuation control means comprising: a fixed pad, first and second diodes each connected in shunt relationship to said pad, and polarized opposite to each other, said pad and said diodes included in said incoming transmission circuit; a positive battery source, and a negative battery source, included in said first outgoing transmission circuit, each connected to a different one of said diodes in said incoming transmission circuit, in response to operation of said switching means to connect said incoming transmission circuit to said first outgoing transmission circuit; said battery sources connected so as to back bias said diodes whereby signals transmitted through said incoming transmission circuit to said first outgoing transmission circuit, via said switching means, are conducted through said fixed pad, and are attenuated by said pad; a positive battery source and a negative battery source, included in said second outgoing transmission circuit each connected to a different one of said diodes in said incoming transmission circuit in response to operation of said switching means to connect said incoming transmission circuit to said outgoing transmission crcuit, said diodes forward biased in response to connection to said positive and negative battery sources; whereby signals transmitted through said incoming transmission circuit to said outgoing transmission circuit via said switching means are conducted through said diodes, and around that fixed pad.

References Cited by the Examiner

UNITED STATES PATENTS

| | | | |
|---|---|---|---|
| 2,681,386 | 6/1954 | Davison et al. | 179—84 |
| 3,135,833 | 6/1964 | MacLeod | 179—16.5 |
| 3,145,266 | 8/1964 | Owen | 179—84 |

KATHLEEN H. CLAFFY, *Primary Examiner.*

W. C. COOPER, *Assistant Examiner.*